United States Patent [19]

Lake et al.

[11] 4,222,205
[45] Sep. 16, 1980

[54] BLAST CLEANING MACHINE FOR PIPES AND OTHER CYLINDRICAL OBJECTS

[75] Inventors: Charles W. Lake, Tuttle; Herb Weber, Yukon, both of Okla.

[73] Assignee: Worldwide Blast Cleaning Limited, Nassau, The Bahamas

[21] Appl. No.: 932,811

[22] Filed: Aug. 10, 1978

[30] Foreign Application Priority Data

Aug. 15, 1977 [GB] United Kingdom ............... 34162/77

[51] Int. Cl.³ ................................................. B24C 3/32
[52] U.S. Cl. ...................................... 51/420; 51/425; 51/432
[58] Field of Search ................. 51/417, 420, 424, 425, 51/432, 433; 134/122 R, 166 C

[56] References Cited

U.S. PATENT DOCUMENTS

| | | | |
|---|---|---|---|
| 2,460,989 | 2/1949 | Kraner | 51/411 X |
| 2,597,434 | 5/1952 | Bishop | 51/425 |
| 3,127,706 | 4/1964 | Giffen | 51/411 X |
| 3,362,109 | 1/1968 | Wallace | 51/411 X |
| 3,385,006 | 5/1968 | Miller | 51/417 |
| 3,523,391 | 8/1970 | Levinson | 51/411 |
| 4,016,681 | 4/1977 | Leliaert | 51/411 |
| 4,080,760 | 3/1978 | Leliaert | 51/425 |

FOREIGN PATENT DOCUMENTS 744466 2/1956 United Kingdom ...................... 51/424

Primary Examiner—Gary L. Smith
Attorney, Agent, or Firm—Beveridge, DeGrandi, Kline & Lunsford

[57] ABSTRACT

A blast cleaning machine for pipes includes means for supporting the pipe in a horizontal position and for rotating the pipe about its axis. The machine also includes an enclosure mounted above the pipe supporting means and the enclosure has a lower opening which is positioned in use close to the upper side of the pipe. A centrifugal blast wheel receives abrasive from a hopper and blasts the abrasive in a downwardly inclined direction through the opening and on to the pipe surface. The spent abrasive rebounds from the pipe surface into a conduit by which the abrasive is conveyed to a reclaim zone in which the abrasive is separated from dirt and other foreign matter and is then returned to the hopper for re-use. The machine can be adjusted for cleaning of pipes of different diameters and in the region of the said lower opening there are interchangeable components by which the size of the opening can be varied according to the pipe diameter.

7 Claims, 1 Drawing Figure

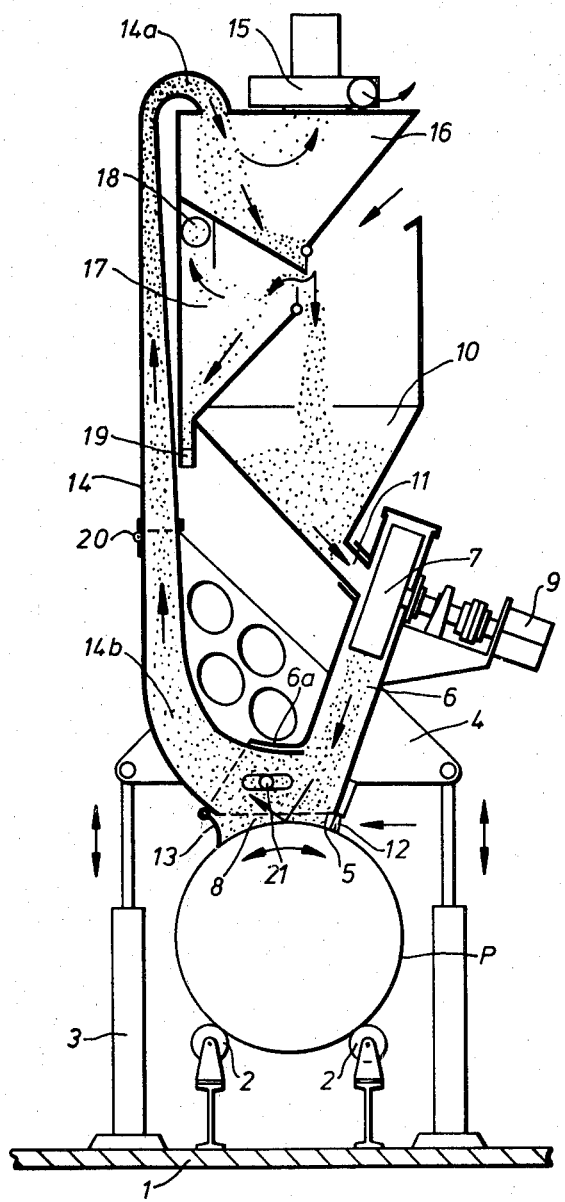

BLAST CLEANING MACHINE FOR PIPES AND OTHER CYLINDRICAL OBJECTS

FIELD OF THE INVENTION

This invention relates to machines for blast cleaning pipes and similar cylindrical objects, hereinafter referred to as "pipes", and is concerned particularly with machines of the kind in which a stream of abrasive, for example abrasive grit, sand, or steel shot, is blasted by a centrifugal blast wheel at an inclined angle on to a surface to be treated, the spent abrasive rebounding from said surface into a conduit for conveyance to a reclaim zone where the abrasive is separated from foreign matter and returned to the blast wheel for re-use.

DESCRIPTION OF THE PRIOR ART

Machines of the particular kind referred to above are known but the known machines are not suitable for cleaning pipes. Machines for blast cleaning of pipes and other cylindrical bodies are known, see for example U.S. Pat. Nos. 2,460,989 (Kraner); 3,127,706 (Giffen); 3,362,109 (Wallace); and 3,523,391 (Levinson) but none of these prior U.S. patents discloses a machine in which the spent abrasive is caused to rebound from the pipe surface into a conduit for conveyance to a reclaim zone in which the abrasive is separated from foreign matter produced by the blast cleaning effect of the abrasive striking the pipe surface at high velocity.

It is an object of this invention to provide a pipe cleaning machine which uses the desirable method of operation of the machines of the particular kind referred to above. In such machines the angle of impact of the abrasive on to a flat surface has to be closely controlled to obtain a rebound of the spent abrasive along a desired path, so that wear on the conduit is kept to a minimum. Such control will become more critical if a curved surface is to be cleaned, because a slight variation in the angle of impact will produce a greater variation in the angle of rebound. A machine for blast cleaning pipes must be readily adaptable to cleaning pipes of different diameters, whilst ensuring favourable collection and reclaim of the rebounding spent abrasive.

SUMMARY OF THE INVENTION

According to this invention a machine for blast cleaning a pipe compriises means for supporting the pipe horizontally in such a manner that it can be rotated about its axis, an enclosure disposed above the support means and having on its lower side an opening arranged to confront the upper side of the pipe located on the support means, a centrifugal blast wheel adapted to receive abrasive from a storage hopper and to project a stream of the abrasive in a downwardly-inclined direction on to the area of the pipe exposed through the said opening, and a conduit by which the abrasive rebounding from the pipe surface is returned to abrasive reclaim means, the enclosure in the region of the said opening comprising adjustable or interchangeable components by means of which the size of the said opening can be varied according to the pipe diameter. Preferably the centrifugal blast wheel and the pipe support means are relatively adjustable in a vertical direction to accommodate different diameter pipes.

BRIEF DESCRIPTION OF THE DRAWING

The single FIGURE of the drawing is a diagrammatic sectional view of a machine constructed in accordance with the invention. The section is taken in a plane at right angles to the axis of a pipe being cleaned.

DESCRIPTION OF THE PREFERRED EMBODIMENT

Referring to the drawing a machine for blast cleaning a pipe comprises pipe support means which includes a base plate 1 supporting on pillars a pair of spaced rollers 2 on which a pipe P to be blast cleaned is located, the pipe being adapted to be rotated, as indicated by the double-headed arrow, by means (not shown) for cleaning the pipe progressively over its entire circumference. Mounted above such pipe support means on hydraulic or pneumatic jacks 3, vertically adjustable as indicated by the two double-headed arrows, is a frame 4 carrying an enclosure formed at its lower side with an opening 5 adapted in use to confront the upper side of the pipe P. The enclosure includes a downwardly-inclined duct 6 leading from a centrifugal blast wheel 7 to a blast area or zone 8 immediately above the opening 5, the blast wheel 7 being driven by a motor 9 and receiving abrasive from a storage hopper 10 by way of a short passage 11 which may, if desired, be provided with means (not shown) for controlling the rate of flow of abrasive from the hopper 10 to the blast wheel 7. Around the edges of the opening 5 are disposed resilient sealing means, the sealing means at the rear edge of the opening, considered in the direction of rebound of the abrasive, being in the form of a strip-like brush 12, whilst the sealing means around the other three edges of the opening each comprise a rubber strip 13. The blast wheel 7 delivers a continuous stream of abrasive down the duct 6, through the opening 5 and on to the exposed area of the pipe P at an angle such that the abrasive rebound from the pipe into a conduit 14 which curves forwardly and upwardly at 14b to deliver the spent abrasive and foreign matter removed from the cleaned pipe surface to a reclaim zone, to be described below.

The passage of spent abrasive away from the pipe surface and through the conduit 14 is augmented or enhanced by a flow of air through the conduit 14 in the same direction. Such flow of air is caused by connecting the upper end 14a of the conduit 14 to a source of suction which, in the present embodiment, is an exhaust fan 15. The air to establish this flow is sucked by the fan 15 into the blast zone at the opening 5 through the brush type sealing strip 12. To assist in maintaining a constant rate of movement of the abrasive through the conduit 14, the latter progressively decreases in cross sectional area in the direction of air flow, as clearly shown in the drawing, so that the velocity ot the air progressively increases towards the upper end 14a of the conduit 14.

An enclosure at the upper end of the machine defines a reclaim zone. This zone includes a chamber 16 into which the upper end 14a of conduit 14 discharges and to which is connected the exhaust fan 15. This upper end 14a increases progressively in cross sectional area as shown, to reduce the speed of entry of the abrasive into the chamber 16 so that dust and other lighter dirt particles are carried in the air stream to the fan 15 and thence to an air outlet embodying a dust extractor (not shown). The heavier dirt particles fall as indicated into the chamber 16 and through an opening at the bottom thereof. Here a further flow of air into a second chamber 17 of the reclaim zone, which further air flow is caused by an outlet 18 connected to the exhaust fan 15, creates a second stage of separation, the abrasive falling into the storage hopper 10 whilst the heavier dirt particles are conducted to the chamber 17 and, by way of an outlet channel 19 and an airlock (not shown), to a disposal point. In another embodiment of the invention this two-stage reclaim operation is replaced by a single stage separation.

As previously mentioned the size of the opening 5 is dependent upon the amount of curvature of the pipe wall which is related to the pipe diameter. To make the size of the opening adjustable, the lower section 14b is hinged at 20 to the main conduit 14 and at its lower end assists to define the opening 5, the terminal portion of the lower section 14b having telescopic sliding engagement with an offset portion 6a of the duct 6. A bolt and slot or equivalent connection 21 serves to secure the conduit section 14b in a required, adjusted position. In another embodiment the lower conduit section 14b could be completely removable and be substituted selectively by one or more interchangeable sections for defining a blast opening 5 of different size.

Although there is shown an arrangement in which the pipe supports 2 are fixed and the frame 4 is vertically adjustable relative thereto, it will be understood that the frame could be mounted on a fixed structure, the pipe supports 2 being adjustable in height. Furthermore, the jacks 3 for raising and lowering the frame 4 may be substituted by a screw mechanism or equivalent mechanical means.

We claim:

1. A machine for blast cleaning a cylindrical workpiece comprising means for supporting the workpiece horizontally in such a manner that it can be rotated about its axis, an enclosure disposed above the support means and having on its lower side an opening arranged to confront the upper side of the workpiece located on the support means, A centrifugal blast wheel adapted to receive abrasive from a storage hopper and to project a stream of the abrasive in a downwardly inclined direction on to the area of the workpiece exposed through the said opening, and a conduit by which abrasive rebounding from the workpiece surface is returned to abrasive reclaim means, wherein the enclosure includes a duct through which abrasive is projected by the blast wheel and the said conduit includes a lower hinged portion, which assists to define the said opening and which is displaceable relative to a fixed portion of the said conduit to vary the size of the said opening, means being provided for securing the lower hinged portion in an adjusted position.

2. A machine according to claim 1 wherein the blast wheel and the workpiece support means are relatively adjustable in a vertical direction.

3. A machine according to claim 1 wherein means are provided for maintaining a flow of air through the said conduit which progressively decreases in cross sectional area in a direction away from the said opening.

4. A machine according to claim 3 including sealing means around the said opening, part of the sealing means providing an opening through which air is caused to flow across the opening and into the said conduit.

5. A machine according to claim 1 wherein the enclosure includes an abrasive reclaim zone, the said conduit including a portion of progressively-increasing cross sectional area where it enters the abrasive reclaim zone.

6. A machine according to claim 1 wherein said centrifugal blast wheel is positioned in said duct through which projected abrasive passes before striking said workpiece, said duct terminating in a lower end, which assists to define said opening.

7. A machine according to claim 6 wherein said lower hinged portion of said conduit terminates in a lower end that is in telescopic sliding engagement with said lower end of said duct.

* * * * *